C. L. DEAN.
PROCESS OF DRYING SOLUTIONS.
APPLICATION FILED APR. 27, 1918.
1,350,072.
Patented Aug. 17, 1920.
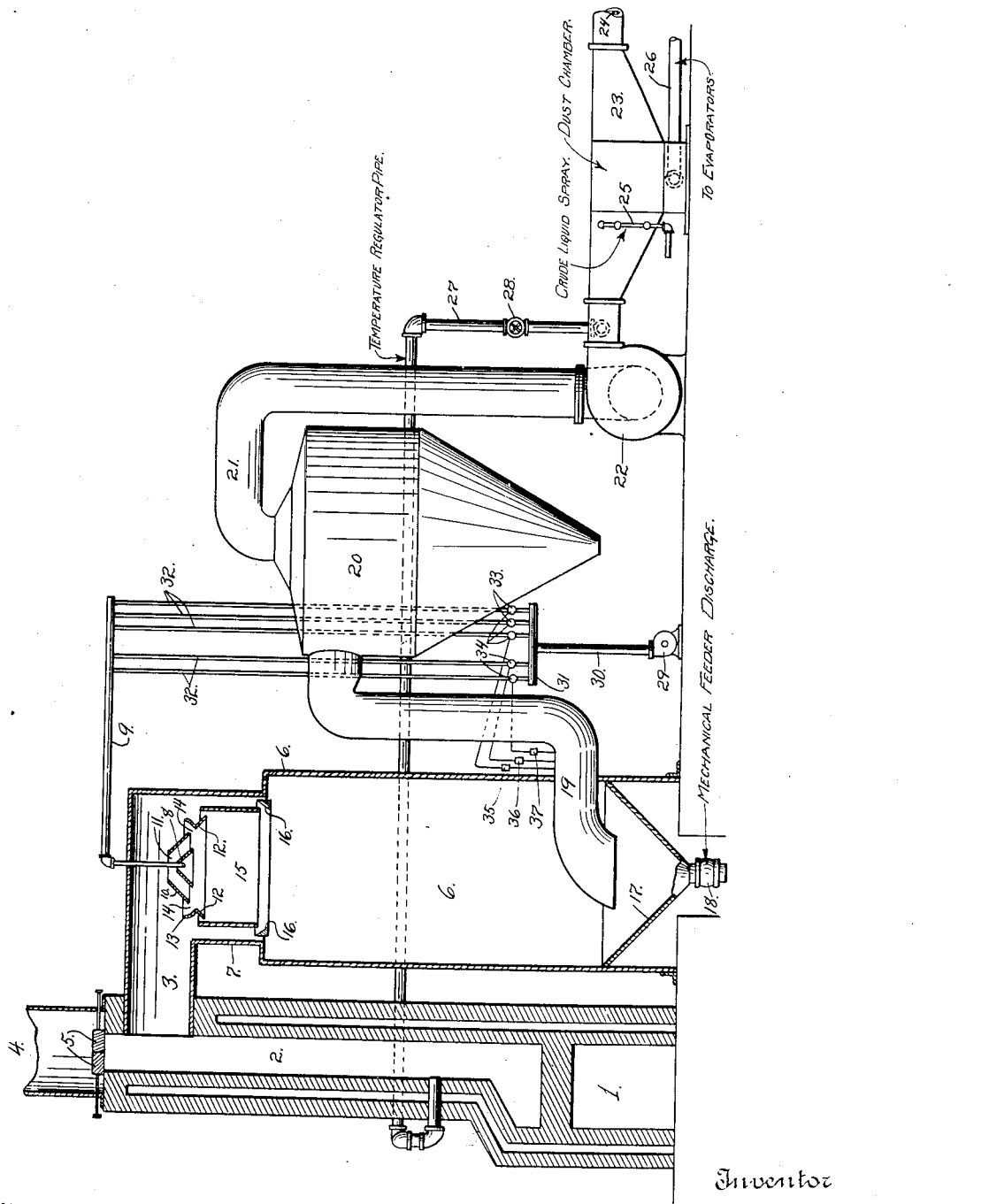

UNITED STATES PATENT OFFICE.

CHARLES L. DEAN, OF DENVER, COLORADO.

PROCESS OF DRYING SOLUTIONS.

1,350,072.    Specification of Letters Patent.    Patented Aug. 17, 1920.

Application filed April 27, 1918. Serial No. 231,288.

*To all whom it may concern:*

Be it known that I, CHARLES L. DEAN, a citizen of the United States, and a resident of the city and county of Denver and State of Colorado, have invented a certain new and useful Improvement in Processes of Drying Solutions, of which the following is a full, clear, and exact description.

My invention is a process of drying solutions; and, while applicable to substantially all cases where the recovery of solids in solution is sought, it is particularly adapted to the last step of drying those highly concentrated solutions which are obtained either in various manufacturing processes or in the recovery of certain salts from solutions in which they occur in nature. One of the primary objects of my invention is the provision of a process of drying solutions by direct contact of these solutions in the form of spray with relatively highly heated gases and the prevention of contact of the moisture of the spray with the walls of the vessel prior to the time when drying has so far progressed as to render the solid product not adhesive to the walls of the chamber in which the operation is being carried out. Further and more particular objects and advantages of my invention will later appear from this specification.

In the single figure of the drawing accompanying this application I have illustrated an apparatus adapted to the carrying out of my process but it will be understood, of course, that other forms of apparatus may be utilized. In the drawing the reference numeral 1 indicates a furnace where suitable fuel is burned and from which the products of combustion pass through a stack 2 and passage 3 to the upper end of the drying chamber. The stack 2 is connected to a chimney 4 whereby, the dampers 5 being open, the products of combustion may be allowed to escape while building the fire. After the fire is well kindled the dampers 5 are closed and all the products of combustion are directed through the drier.

The drier consists of a vertical chamber 6, preferably cylindrical in form, and provided at its upper end with a reduced neck 7. Within the neck there is provided means for introducing a spray of the solution to be treated and a series of streams of heated gases. The means for introducing the solution consists of a single spray or a plurality of sprays located at 8 and supplied with the solution under pressure from a pipe 9. The means for subjecting the spray just described to the heated gases are designed to provide a film or envelop of highly heated substantially dry gases between the walls of the apparatus and the spray solution until such time as the solids in solution shall be substantially dried out of the spray and also cooled below the fusing or melting point of the solid so produced. These tend to prevent adhesion of the solids to the walls of the apparatus. In the apparatus illustrated these means comprise a truncated cone 10 which surrounds the spray and which admits a stream of gases through its open upper end 11. This stream passes down the inner surface of cone 10 thus protecting it from contact with liquid moisture from the spray. Below the cone 10 there is located a ring 13 which has its smallest dimension substantially midway and in a line with the sides of the cone 10 and which flares outwardly both above and below its smallest dimension. This lower flare forms the surface 12 and the upper flare leaves a space 14 between the ring 13 and the cone 10 through which a downwardly converging stream of drying gases will be directed. Below the element 13 there is a substantially cylindrical member 15 which is in turn slightly larger than the ring 13 thus leaving a space between its inner wall and the lower edge of the ring adapted to direct a cylindrical stream of gases. The cylinder 15 is also spaced from the walls of the neck 7 and it extends down substantially to the point where the chamber walls flare below the neck 7. Within the space between the chamber walls and the lower edge of cylinder 15 there is disposed a ring 16 which has its outer walls vertical and its inner walls downwardly converging as shown.

At the lower end of the chamber 6 there is a hopper 17 in which a large percentage of the solids dried out of the solution are deposited and from which they may be withdrawn by any suitable form of mechanical feeder discharge 18. The gases escaping from the chamber 6 through the pipe 19 are discharged into the upper end of a cyclone dust separator 20 where further of the solids are removed from the gases. From the separator 20 the gases are withdrawn through a pipe 21 by a suction fan 22 and discharged into the dust chamber 23 from whence they pass through the opening 24 to the atmosphere. Within the dust chamber 23 I provide a spray nozzle 25 which is supplied with the crude unevaporated liquid which forms the start of the concentrating process. This liquid spray serves to trap a large portion of any dust still remaining in the escaping gases and at the same time has its own temperature raised by heat abstracted from the escaping gases and is partially evaporated. This spray settles as liquid in the bottom of the dust chamber and is withdrawn through the pipe 26 to the evaporator.

It is desirable that the gases entering the drier should not be too highly heated and I have therefore provided a by-pass 27 leading from a point just in advance of the dust chamber back to the flue, which by-pass is controlled by a valve 28. If the temperature of the gases in the stack should rise too high the valve 28 can readily be opened and partially heated diluting gases may be introduced into the stack. This is efficiently possible because the escaping gases from this process never approach saturation.

As a further means of controlling the temperature within the drying chamber I have illustrated means for controlling the amount of liquid to be sprayed therein. This liquid is supplied by a pump 29 which operates at a constant pressure. From the pump 29 the liquid passes through pipe 30 to a head 31 which communicates by a plurality of smaller pipes 32 with the pipe 9. Each of these pipes 32 is supplied with a valve, two of these valves, numbered 33, being illustrated as hand operable valves. The remainder of the valves, numbered 34, are illustrated as being automatically operated under the control of a series of thermostats 35, 36, 37 located in the pipe 19 adjacent the point where it leaves the chamber 6.

In carrying out my process after the fire has been well kindled and the dampers 5 closed the gases from the combustion pass through the stack 2 and the passage 3. Due to the partial vacuum maintained in the chamber 6 by the powerful fan 22 and the restricted size of the hot gas feed passages the heated gases pass through any opening provided therefor with a high velocity. The first of these openings is that numbered 11 and the gases which come in through that opening following a diverging path, and serve to protect the surface of the inner cone 10 from contact with liquid from the spray. Through the opening 14 heated gases having a converging path are admitted and these pick up the spray discharged from 8 and carry it with a mixing movement toward the center. Such gases as enter between the outer surface of the ring 13 and the inner surface of the cylinder 15 have a general cylindrical direction staying close to the cylinder 15 and serving to protect its surface from contact with any liquid moisture. A still further current of air comes down in the space between the cylinder 15 and the walls of the neck 7 and this is divided by the ring 16 into two currents. The inner one of these is a converging one serving to further mix and dry the mixture of gases which it meets; and the outer one is a cylindrical current which serves to insulate the walls of the chamber 6.

On account of the fact that a considerable excess of heated gases is employed in my process and on account of the marked decrease in velocity of the gases in the chamber 6 due to the latter's relatively large area with respect to that of the entrance passages, the moisture will be substantially all extracted from the solids before these have traveled to the bottom of the chamber 6. These solids fall into the hopper 17 and the gases pass out through 19 to the separator 20 where the principal part of the remaining solid content is removed. While going through the pipe 19 the gases come in contact with a series of thermostats 35, 36, 37. These are arranged and connected so that as the temperature of the escaping gases in pipe 19 falls below a certain point the first of these thermostats 35 will operate to close the connected valve 33; if the temperature should fall still further the thermostat 36 will operate to close another valve; and a still further drop in temperature will bring 37 in operation to close its valve. It will be evident that the pump 29 running at a constant pressure the amount of liquid delivered through the pipes 32 will vary with the resistance offered to flow of the liquid and that a smaller amount can be delivered through any two pipes than all five could accommodate. As a consequence the shutting of one or more valves 34 will cause less of the solution to be sprayed into the drier, abstracting less heat from the gases therein and the temperature of the issuing gases will tend to rise. When this takes place the thermostats will in turn operate to release their valves and allow a spring mechanism to open them. In order to prevent deposition of moisture in the chamber 6 or separator 20, the gases passing through pipe 19 should be well above their dew point.

While I have described in considerable detail the preferred form of apparatus employed in carrying out my process and also the details of my process, it will be understood, of course, that I am not limited to the use of any particular apparatus nor to the precise details of the process described further than indicated by the appended claims.

Having thus described my invention what I claim and desire to secure by Letters Patent is:

1. A process of drying solutions comprising spraying said solutions into a chamber and subjecting said spray to a series of alternating convergent and cylindrical streams of relatively highly heated, dry gases.

2. A process of drying solutions comprising spraying said solutions into a chamber, subjecting said spray to a series of alternating convergent and cylindrical streams of highly heated gases, and progressively checking the velocity of travel of the mixture.

3. A process of drying solutions consisting in spraying said solutions into the top of a cylindrical, vertical chamber, subjecting the spray so produced to a series of alternating convergent and cylindrical streams of gases heated to a predetermined temperature, progressively checking the velocity of the mixture as a result of the shape given said chamber, whereby said heated gases extract the moisture from said solutions and separate their solids and all liquid moisture is kept from contact with the walls of said chamber by said cylindrical streams of gases, and separating the solids from the gases.

4. In a process of drying solutions, the step of introducing a spray of the solution within enveloping and inclosed alternately convergent and cylindrical streams of high temperature gases.

5. In a process of drying solutions, the step of introducing a spray of the solution within an enveloping convergent stream of high temperature gases surrounded by an inclosed cylindrical stream of the same gases.

In testimony whereof I have hereunto affixed my signature.

CHARLES L. DEAN.